US009739124B2

(12) United States Patent
Akiya et al.

(10) Patent No.: US 9,739,124 B2
(45) Date of Patent: Aug. 22, 2017

(54) ENHANCED STEAM EXTRACTION OF IN SITU BITUMEN

(71) Applicant: Dow Global Technologies LLC, Midland, MI (US)

(72) Inventors: Naoko Akiya, Missouri City, TX (US); Paul A. Gillis, Lake Jackson, TX (US); Harpreet Singh, Pearland, TX (US); Abu Mokhtarul Hassan, Pearland, TX (US); Zubin B. Kuvadia, Houston, TX (US)

(73) Assignee: Dow Global Technologies LLC, Midland, MI (US)

( * ) Notice: Subject to any disclaimer, the term of this patent is extended or adjusted under 35 U.S.C. 154(b) by 38 days.

(21) Appl. No.: 14/766,251

(22) PCT Filed: Mar. 19, 2014

(86) PCT No.: PCT/US2014/031155
§ 371 (c)(1),
(2) Date: Aug. 6, 2015

(87) PCT Pub. No.: WO2014/160563
PCT Pub. Date: Oct. 2, 2014

(65) Prior Publication Data
US 2016/0069172 A1 Mar. 10, 2016

(51) Int. Cl.
| | |
|---|---|
| *E21B 43/24* | (2006.01) |
| *C09K 8/592* | (2006.01) |
| *C09K 8/58* | (2006.01) |
| *C10G 1/04* | (2006.01) |

(52) U.S. Cl.
CPC ............ *E21B 43/2406* (2013.01); *C09K 8/58* (2013.01); *C09K 8/592* (2013.01); *C10G 1/047* (2013.01)

(58) Field of Classification Search
None
See application file for complete search history.

(56) References Cited

U.S. PATENT DOCUMENTS

| | | |
|---|---|---|
| 2,233,381 A | 2/1941 | De Groote et al. |
| 3,410,344 A | 11/1968 | Cornelius |
| 3,902,557 A | 9/1975 | Shaughnessy et al. |
| 3,993,133 A | 11/1976 | Clampitt |
| 3,994,345 A | 11/1976 | Needham |
| 4,216,828 A | 8/1980 | Blair |

(Continued)

FOREIGN PATENT DOCUMENTS

| | | |
|---|---|---|
| CA | 2791492 | 3/2013 |
| WO | 2014099466 | 6/2014 |

OTHER PUBLICATIONS

ALS Environmental 2-Ethoxyethanol Information; http://www.caslab.com/2-Ethoxyethanol-2.php5; pp. 1-2; Printed Dec. 20, 2016.*

(Continued)

*Primary Examiner* — Anuradha Ahuja
(74) *Attorney, Agent, or Firm* — Steven W. Mork

(57) ABSTRACT

A process includes: (a) injecting a steam composition into a subterranean location containing bitumen, the steam composition containing an alkylene glycol ether and steam, wherein the alkylene glycol ether is other than a glycol ether amine; and (b) recovering bitumen from the subterranean location to above the ground.

11 Claims, 1 Drawing Sheet

(56) References Cited

U.S. PATENT DOCUMENTS

| | | | |
|---|---|---|---|
| 4,787,453 A * | 11/1988 | Hewgill | C09K 8/575 |
| | | | 106/900 |
| 6,225,263 B1 | 5/2001 | Collins et al. | |
| 6,230,814 B1 | 5/2001 | Nasr et al. | |
| 6,242,388 B1 * | 6/2001 | Sharma | B01F 17/0064 |
| | | | 134/40 |
| 6,357,526 B1 | 3/2002 | Abdel-Halim et al. | |
| 7,770,643 B2 | 8/2010 | Daussin | |
| 7,771,588 B2 | 8/2010 | Engel et al. | |
| 7,938,183 B2 | 5/2011 | Hart et al. | |
| 2008/0083534 A1 * | 4/2008 | Daussin | C09K 8/592 |
| | | | 166/272.4 |
| 2008/0139418 A1 * | 6/2008 | Cioletti | C10G 1/04 |
| | | | 507/261 |
| 2009/0145809 A1 | 6/2009 | Ledbetter, Jr. et al. | |
| 2010/0012331 A1 | 1/2010 | Larter et al. | |
| 2010/0139922 A1 | 6/2010 | Latimer | |
| 2011/0174695 A1 | 7/2011 | Goldman | |
| 2011/0309001 A1 | 12/2011 | Soane et al. | |
| 2013/0081808 A1 | 4/2013 | Zeidani et al. | |

OTHER PUBLICATIONS

ALS Environmental 2-methoxyethanol Information; http://www.caslab.com/Ethylene_glycol_monomethyl_ether_2-methoxyethanol_CAS_109-86-4/; pp. 1-2; Printed Dec. 20, 2016.*

Adkins, J.D., Field Results of Adding Surfactant to Cyclic Steam Wells, Society of Petroleum Engineers of AIME, 1983, Dallas, Texas.

Lebedeva, Mazaev, et al., Synthesis of Glycol Ethers and Their Use for Intensification of Oil Recovery, Russian Journal of Applied Chemistry, vol. 74, No. 8, 2001, pp. 1376-1378.

N.N. Lebedeva, et al., Synthesis of Glycol Ethers and Their Use for Intensification of Oil Recovery, Russian Journal of Applied Chemistry, vol. 74, No. 8 (2001) 1415-1417.

* cited by examiner

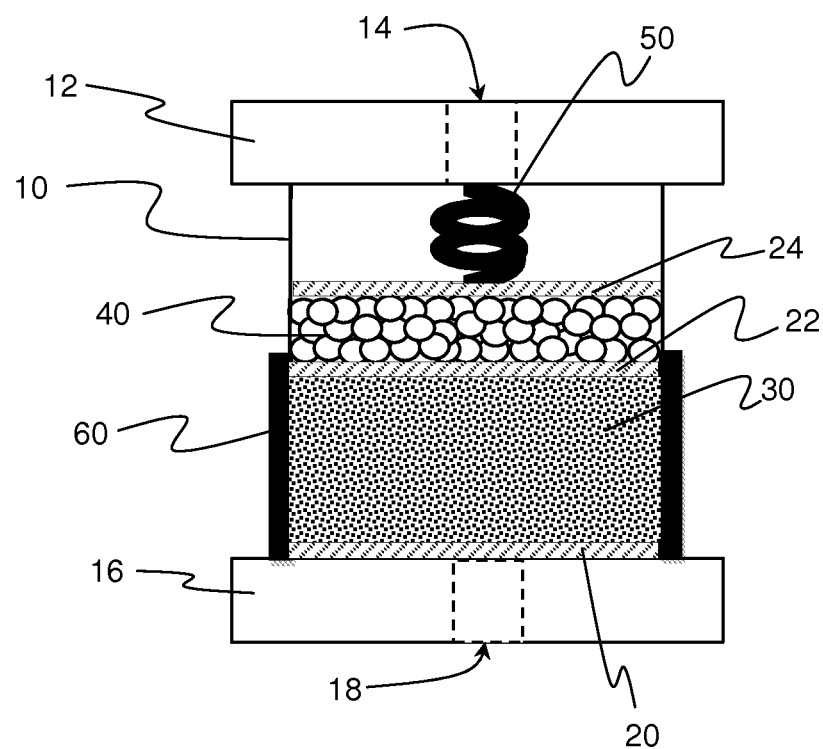

ENHANCED STEAM EXTRACTION OF IN SITU BITUMEN

BACKGROUND OF THE INVENTION

Field of the Invention

The present invention relates to an in situ steam extraction method for removing bitumen from underground locations.

Introduction

Bitumen recovery from oil sands is a challenging activity that requires accessing subterranean bitumen, extracting the bitumen from the subterranean sand and then recovering the bitumen from the subterranean location to above ground. There are numerous proposed methods for recovering bitumen from oil sands. The Background section of US2008/0139418 provides a review of many recovery methods including strip mining, cold flow technique, cyclic steam stimulation (CSS), steam assisted gravity drainage (SAGD) and vapor extraction process (VAPEX).

Strip mining removes bitumen together with sand from underground and then extracts bitumen from the sand while above the ground. Strip mining is not an in situ extraction method because it involves extracting bitumen from sand after removing the sand from the ground. In situ extraction of bitumen involves extracting bitumen from sand in its natural location underground. In situ extraction is more desirable than strip mining because it is less damaging to the landscape than strip mining.

The cold flow technique is only useful for recovering oils that have low enough viscosity to pump at reservoir conditions. Bitumen is too viscous in most subterranean oil sand deposits to allow the cold flow technique to be a reasonable method for recovering bitumen from oil sands.

VAPEX is a method that requires injecting hydrocarbon solvents into a first horizontal well that extends into subterranean oil sands. The solvents penetrate into the oil sands, reduce the viscosity of bitumen by dilution and enable the bitumen/solvent mixture to drain into a second horizontal well below the first from which recovery of the bitumen/solvent mixture occurs. Desirably, hydrocarbon solvent removed from the bitumen above ground and desirably recycled. The VAPEX method is a "cold" process, which means the material injected into the well is not heated any appreciable amount as opposed to "hot" processes (commonly known as, thermal methods) such as CSS and SAGD where steam is injected into a well. Cold processes such as the VAPEX method are less efficient at extracting bitumen than hot processes such as CSS and SAGD processes because bitumen viscosity is higher at lower temperatures. Therefore, to be effective, the VAPEX method requires injection of large amounts of hydrocarbon solvents into the well in order to sufficiently dilute the bitumen to achieve drainage.

Use of hydrocarbon solvents, particularly high concentrations of hydrocarbon solvents, can be undesirable in in situ bitumen recovery processes. Hydrocarbons can cause asphaltenes to precipitate from bitumen and the precipitated asphaltenes can undesirably reduce the reservoir permeability. Additionally, hydrocarbon solvent can be lost into the surrounding subterranean environment, which can result in environmental contamination concerns and increased processing costs. Use of large amounts of hydrocarbon solvents, necessary for suitable solvating of bitumen, also requires and extra process step to recover the hydrocarbon from the bitumen upon extraction of the bitumen. Therefore, it is desirable to avoid both "cold" process methods and the use of hydrocarbons during in-situ bitumen recovery.

CSS and SAGD processes are "hot" processes (that is, thermal methods) that use hot steam to decrease the viscosity of subterranean bitumen. In these processes steam is injected down a first well into subterranean oil sands. The steam penetrates the sands and lowers the viscosity of bitumen by heating the oil sands, which facilitates flow of the bitumen through the sands into either the first well (CSS) or to a second well (SAGD) from which recovery of the bitumen occurs. With the CSS method, steam is injected into a well at temperatures of 250° C.-400° C. The well then sits for days or weeks during which time the steam heats bitumen in the subterranean environment around the well causing bitumen to drain into the well and after which hot oil mixed with condensed steam is pumped out from the well for weeks or months. Then the process is repeated. In the SAGD process two horizontal wells are drilled, one below the other (generally approximately five meters apart). Steam is injected into the upper well, heating bitumen in the surrounding subterranean environment thereby lowering the viscosity of the bitumen causing it to flow into the lower well. The resulting bitumen and condensed steam mixture is subsequently pumped to the surface from the bottom well. According to US2008/0139418, recovery of bitumen from an oil sands reservoir by CSS is typically only about 20-25 percent (%) while recovery in SAGD processes is reportedly up to about 60% of the available bitumen in the oil sands reservoir.

A modified version of the SAGD process is also known. U.S. Pat. No. 6,230,814 describes what has become known as the expanding solvent steam assisted gravity drainage (ES-SAGD) process. The ES-SAGD process requires combining hydrocarbons with steam in a SAGD-type process so the hydrocarbons can solubilize bitumen in subterranean oil sands to further reduce bitumen viscosity to facilitate the drainage of bitumen into a second well hole for recovery to above ground. The reference identifies suitable additives as hydrocarbons having from one to 25 carbons. However, as explained above, it is desirable to avoid injecting hydrocarbons into a well in order to facilitate removal of bitumen.

It is desirable to identify an in situ (that is, subterranean) method for recovering bitumen from oil sands that does not require injecting hydrocarbons into subterranean oil sands but that offers a greater recovery percentages than current CSS and SAGD processes.

BRIEF SUMMARY OF THE INVENTION

The present invention offers an in situ bitumen recovery process using steam that provides a solution to the problem of increasing bitumen recovery percentages relative to current CSS and SAGD processes and without requiring injecting hydrocarbons into the subterranean oil sands.

Surprisingly, injecting alkylene glycol ether with steam in a CSS or SAGD process improves bitumen recovery relative to use of only steam. Even more surprising and unexpected, the improvement in bitumen recovery is evident even with no more than 0.1 wt % of the alkylene glycol ether in the steam, which reveals a tremendous and unanticipated efficiency of the alkylene glycol ether additive in the steam for enhancing bitumen recovery.

Without being bound by theory, alkylene glycol ether is believed to be so surprisingly efficient at facilitating bitumen extraction in CSS and SAGD process because it penetrates with steam into oil sands between bitumen and surrounding sand material. Bitumen then is displaced from surrounding sand material by the aqueous phase interpenetrating between the bitumen and sand material resulting in bitumen contacting the aqueous phase rather than sand material. The alkylene glycol in the aqueous phase reduces the interfacial tension between the aqueous phase and bitumen thereby facilitating flow of the bitumen through the sand material. Yet, while acting as an efficient surface active agent, the alkylene glycol ethers are surprisingly well suited to in situ bitumen extraction relative to traditional surfactants. Traditional surfactants are difficult to disperse in steam while alkylene glycol ethers can form non-ideal mixtures (for example, azeotropes) with water allowing higher concentrations than expected from pure component boiling point. Additionally, the alkylene glycol ethers seem to transport more efficiently than surfactants and especially amine components that have a high tendency to adsorb onto materials during transport across a reservoir.

Hence, alkylene glycol ethers are believed to be especially well suited for in situ bitumen recovery by thermal recovery methods such as CSS and SAGD because they are efficiently dispersed and transported in steam and can be used at low concentrations. Glycol ethers presumably can be used in low concentrations because they function as a surface active component with respect to the bitumen. By acting at the surface of bitumen rather than solvating the entire mass of bitumen much lower quantities of the alkylene glycol ether are needed to facilitate bitumen drainage than are needed with hydrocarbon solvation processes. Hence, the present process does not have ground contamination and additive recovery concerns associated with hydrocarbon solvents. Likewise, lower concentrations are needed relative to traditional surfactants because dispersion in steam is more efficient and less additive is lost to adsorption during transport. Alkylene glycol ethers also offer greater thermal stability than amine additives, which makes alkylene glycol ethers more suitable for high temperature applications such as CSS and SAGD processes.

In a first aspect, the present invention is a process comprising: (a) injecting a steam composition into a subterranean location containing bitumen, the steam composition comprising an alkylene glycol ether and steam, wherein the alkylene glycol ether is other than a glycol ether amine; and (b) recovering bitumen from the subterranean location to above the ground wherein the alkylene glycol ether is other than a glycol ether amine and wherein the alkylene glycol ether has the following chemical formula:

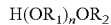

$H(OR_1)_nOR_2$ where $R_1$ is an alkylene unit, $OR_1$ is an alkylene glycol unit, and $R_2$ is an alkyl or aryl, $OR_2$ is an alkyl ether component or aryl ether component and n is an integer that has a value of one or more, each alkylene unit has more than two carbons and when n is more than one the $R_1$ in each of the alkylene glycol units can be the same or different.

The process of the present invention is useful for extracting bitumen from oil sands.

BRIEF DESCRIPTION OF THE DRAWINGS

FIG. 1 provides an illustration of a vessel used to determine bitumen extraction efficiency in Experiments 1-9.

DETAILED DESCRIPTION OF THE INVENTION

"Multiple" means two or more. "And/or" means "and, or as an alternative". All ranges include endpoints unless otherwise indicated.

The process of the present invention requires injecting a steam composition through a well into a subterranean location containing bitumen. The subterranean location is desirably in or proximate to an oil sand deposit. Oil sand is also known as tar sands or bituminous sands. Oil sand is loose sand, or partially consolidated sandstone containing mixtures of sand, clay and water, that includes bitumen. Canada, Kazakhstan and Russia all contain large quantities of oil sand deposits. The process of the present invention extracts bitumen from other components of the oil sands in a subterranean location by injecting a steam composition into the subterranean oil sand deposit to increase the flowability of the bitumen, thereby enabling the bitumen to drain from the oil sand components and eventually be recovered by pumping above ground. The process of the present invention avoids first having to remove oil sand from underground in order to extract bitumen from the removed oil sand as is required in a strip mining process. Instead, the present invention extracts bitumen from oil sands in situ, that is, in the subterranean location of the oil sand.

The steam composition of the present invention comprises both steam and alkylene glycol ether. The composition is desirably injected at a temperature and pressure sufficient to provide a steam composition at a temperature of 150° C. or higher, preferably 180° C. or higher and at the same time desirably a temperature of 300° C. or lower, preferably 260° C. or lower.

The steam in the steam composition can be superheated steam, saturated steam, less than 100 percent quality steam or any combination thereof. "Superheated steam" is steam that is at a temperature above the vapor-liquid equilibrium point of water. "Saturated steam" is synonymous with 100 percent quality steam. The quality of steam is a characteristic of how much liquid water phase is present in the steam. 100 percent quality steam has zero percent liquid phase water present. "Less than 100 percent quality steam" has liquid water present. A steam composition that is less than 100 percent quality steam can include the resulting composition from feeding a steam feed and a liquid aqueous phase feed together (as is done, for example, in Examples 1-5 herein).

The alkylene glycol ether is desirably volatile at the temperature, pressure and environment of the steam composition when injected into a well as described above. Preferably, the alkylene glycol ether forms an azeotrope with water in order to optimize efficiency in dispersion and transport in steam.

In the broadest scope of the present invention, the alkylene glycol ether is not limited in composition except that is it other than a glycol ether amine. In general, the alkylene glycol ether has the following chemical formula:

$H(OR_1)_nOR_2$

Where:
$R_1$ is referred to herein as an alkylene unit or the simply the alkylene,
$OR_1$ is referred to as an alkylene glycol unit, and
$R_2$ is referred to as an alkyl or aryl and $OR_2$ is an alkyl ether component or aryl ether component. $R_2$ can be a pure alkyl, pure aryl or it can be a substituted alkyl or aryl comprising elements other than carbon and hydrogen. "Pure" in this description means consisting of only carbon and hydrogen. Typically, $R_2$ consists of carbon and hydrogen atoms. Desirably, $R_2$ is linear, or straight-chain, which means if there are more than two carbons the carbons are bound in sequential fashion to form a chain without branching.

The value of n is an integer that is one or more. While in the broadest scope there is no known upper limit for n, it is desirable for n to be 10 or less, preferably 8 or less, still more preferably 6 or less, even more preferably 4 or less and can be 3 or less, even 2 or less and n can be one. When n is one, the compound is a monoalkylene glycol ether. When n is two, the compound is a dialkylene glycol ether. When n is three, the compound is a trialkylene glycol ether. When n is greater than one, the compound is broadly considered a polyalkylene oxide ether. $R_1$ and $R_2$ are carbon-containing moieties and preferably $R_1$, $R_2$ or both $R_1$ and $R_2$ consist of only carbon and hydrogen. When n is greater than one, $R_1$ in each of the alkylene glycol units can be the same or different. If the alkylene glycol ether contains different alkylene units, then each of the alkylene units are consistent with requirements for alkylene units stated below and independently can adhere to the optional (for example, desirable or preferred) characteristics for alkylene units described below.

Desirably, the alkylene glycol ether is selected from monoalkylene, dialkylene and trialkylene glycol ethers as opposed to polyalkylene glycol ethers having more than three alkylene glycol units. The shorter monoalkylene, dialkylene and trialkylene (especially the mono and dialkylene) glycol ethers tend to: (a) be more volatile and have better mobility with the steam; and (b) penetrate into oil sands more quickly and readily than larger polyalkylene glycol ethers.

In addition to the preferences for number of alkylene glycol units, or as an alternative to the preferences for the number of alkylene glycol units, it is possible for the alkylene glycol unit to have more than two carbon atoms per alkylene unit. It has been surprisingly discovered that alkylenes longer than ethylene are effective for use in facilitating steam extraction of bitumen from oil sand in an in situ process. At the same time, it tends to be desirable for each alkylene unit to contain fewer than 8, preferably 6 or fewer and more preferably 5 or fewer carbons and typically 4 or fewer carbon atoms. Desirably, each alkylene unit contains three or four carbons, preferably three carbons.

In addition to any one or both of the number of alkylene unit preferences and number of carbons per alkylene unit preferences, or as an alternative to either or both of those preferences, it is generally desirable for the entire alkylene glycol ether molecule to contain fewer than ten carbon atoms. When the alkylene glycol ether contains fewer than ten carbon atoms it is believed that the ethylene glycol ether tends to be both more volatile and exhibit greater mobility within the oil sands.

Examples of desirable alkylene glycol ethers include those selected from a group consisting of ethylene glycol ether, propylene glycol ether and butylene glycol ether. Especially desirable are monoalkylene, dialkylene and trialkylene versions of ethylene glycol ether, propylene glycol ether and butylene glycol ether. The alkylene glycol ether can be selected from monoalkylene and dialkylene versions, or even just monoalkylene versions, of ethylene glycol ether, propylene glycol ether and butylene glycol ether. Surprisingly, the selected alkylene glycol ether can be the propylene glycol ether and/or butylene glycol ethers.

Specific examples of suitable alkylene glycol ethers include any one or any combination of more than one of the following: propylene glycol n-butyl ether (such as DOWANOL™ PnB glycol ether, DOWANOL is a trademark of The Dow Chemical Company), dipropylene glycol methyl ether (such as DOWANOL DPM glycol ether), dipropylene glycol n-propyl ether (such as DOWANOL DPnP glycol ether), propylene glycol n-propyl ether (such as DOWANOL PnP glycol ether), dipropylene glycol n-butyl ether (such as DOWANOL DPnB glycol ether), ethylene glycol mono-hexyl ether (for example, Hexyl CELLOSOLVE™ solvent, CELLOSOLVE is a trademark of The Dow Chemical Company), ethylene glycol mono-n-propyl ether (such as propyl CELLOSOLVE Solvent), diethylene glycol monohexyl ether, ethylene glycol mono-n-propyl ether (such as Propyl CELLOSOLVE Solvent), diethylene glycol monohexyl ether (such as Hexyl CARBITOL™ Solvent, CARBITOL is a trademark of The Dow Chemical Company), diethylene glycol monobutyl ether (such as Butyl CARBITOL Solvent) and triethylene glycol monobutyl ether.

The steam composition can contain one alkylene glycol ether or a mixture of more than one kind of alkylene glycol ether. Desirably, if the steam composition contains a mixture of more than one kind of alkylene glycol ether, more than one of the alkylene glycol ethers and preferably all of the alkylene glycol ethers are selected from those having the properties as described above for the alkylene glycol ether of the present invention.

The amount of alkylene glycol ether required in the steam composition to achieve improvement in bitumen extraction over steam alone is surprisingly low. The steam composition can contain as little as 0.01 weight-percent (wt %) of alkylene glycol ether and still demonstrate an improvement in bitumen extraction over use to steam alone in the same process. Typically, the steam composition contains 0.05 wt % or more, more typically 0.1 wt % or more, more typically 0.2 wt % or more, and can contain 0.3 wt % or more, 0.4 wt % or more or 0.5 wt % or more alkylene glycol ether. At the same time, the steam composition can contain 25 wt % or less, yet preferably contains 10 wt % or less, more preferably 7 wt % or less, yet more preferably 5 wt % or less and can contain 4 wt % or less alkylene glycol ether. Excessive amounts of alkylene glycol ether cause the cost of the process to increase so lower concentrations of the alkylene glycol ether are desirable from a cost standpoint. The wt % of alkylene glycol ether is based on total combined weight of steam and alkylene glycol ether.

Desirably, the steam composition is free of glycol ether amine. In general, the process of the present invention is desirably free of glycol ether amine as an extraction aid. Amines tend to be undesirably thermally unstable and can break down during the injection process they also tend to chemically bind to components in the process.

The steam composition can be free from hydrocarbons when injecting the steam composition into a subterranean location. The process of the present invention can be free of injecting hydrocarbons in any manner, whether in a steam composition or otherwise, into a well. Use of hydrocarbons is unnecessary in the present invention. Moreover, hydrocarbons can be undesirable for reasons set forth in the Background section.

It is also desirable for the process of the present invention to be free of injecting a liquid-phase solvent or an alkaline water-based extraction liquid into a well. These steps are unnecessary in the present invention and would unnecessarily add complexity the present extraction process.

In its broadest scope, the present invention is independent from how to form the steam composition. For example, an aqueous solution of the alkylene glycol ether can be boiled to create the steam composition, alkylene glycol ether (neat or as an aqueous solution) can be introduced to steam, or any combination thereof.

After injecting the steam composition into a subterranean location containing bitumen, the process further includes extracting bitumen from the subterranean location to above the ground. The steam composition serves to cause the bitumen to become flowable allowing it to be pumped from underground to above ground. The process of the present invention can take the form of a cyclic steam stimulation (CSS) process where bitumen is pumped up the same well that the steam composition is injected, a steam assisted gravity drainage (SAGD) where bitumen is pumped up a second well other than the well through which the steam composition is injected into the ground, or conceivable a combination of both CSS and SAGD type processes.

Examples 1 and 2

Alkylene glycol ethers for use in the following examples can be made by ordinary means known to one of ordinary skill in the art by reacting the appropriate alcohol with the appropriate alkylene oxide in the presence of a suitable catalyst and then distilling the resulting mixture to obtain the alkylene glycol of interest. When commercially available, the commercial trade name is provided below.

The examples use a set up similar to that illustrated in FIG. 1 to simulate steam assisted extraction of bitumen from oil sands. Provide a container 10 having lid 12 with entrance opening 14 defined there through and opposing bottom 16 with exit opening 18 defined there through. Within container 10 place the following in order: screen 20 over bottom 16 so as to cover exit opening 18, 100 grams of high-grade mined oil sand (from Alberta Innovates Technology Futures sample bank) 30 over screen 20, screen 22 covering oil sand 30, a layer of glass beads 40 covering screen 22, screen 24 covering glass beads 40 and spring 50 under compression and positioned between lid 12 and screen 24 so as to hold the contents of container 10 in place. Heater 60 is located around container 10 so as to heat the oil sand 30 to a steam saturation temperature during the experiment.

To simulate oil recovery, inject steam, or steam composition depending on the example, into entrance opening 14 and maintain the injection pressure at 0.8 megaPascals (MPa) for one hour (stage 1) and then increase the pressure to 1.6 MPa for another hour (stage 2). Set heater 60 to the saturation temperature during each stage. Collect discharge from container 10 through exit opening 18.

Inject a steam composition in to opening 14 by co-injecting two streams into opening 14. The first stream is steam injected at four milliliters per minute (liquid water equivalent volume). The second stream is 0.5 milliliters per minute of liquid water. For the examples of the present invention, the liquid water stream contains one wt % of an alkylene glycol ether as identified in Table 1 for a concentration of alkylene glycol ether of 0.1 wt % relative to a combination of steam and alkylene glycol ether weight.

Determine percent bitumen recovery at two points in the process. Determine an Initial Weight-Percent Recovery based on the amount of oil in the discharge collected over the first 20 minutes of the process. Determine a Final Weight-Percent Recovery based on the amount of bitumen in the discharge collected over the full two-hour process. Determine the amount of bitumen extracted at each interval by toluene extraction of the discharge. The toluene extraction method includes mixing toluene with the discharge mixture, isolating the toluene layer, evaporating the toluene to isolate the extracted bitumen and then weighing the extracted bitumen. Determine the percent bitumen recovery for the two points in the process by dividing the weight of the extracted bitumen by the weight of the bitumen in the original oil sand material. Determine the weight of bitumen in the original oil sand by doing a toluene extraction of a sample of the original oil sand having a known weight. From the known weight of the oil sand sample and the weight of bitumen extracted in the toluene extraction the wt % bitumen in the oil sand is readily calculated by dividing the extracted bitumen weight by the known oil sand weight and multiplying by 100. This value can be used to determine how much bitumen was in the oil sand used in the experiments by first measuring the weight of the oil sand prior to injecting the steam or steam composition.

Table 1 provides the results for a Reference that contains no alkylene glycol ether as well as Examples 1 and 2 that illustrate examples of the present invention where the steam composition contains 0.1 wt % of alkylene glycol ether.

TABLE 1

| Sample | Alkylene Glycol Ether | Initial Wt % Recovery | Final Wt % Recovery |
| --- | --- | --- | --- |
| Reference | (none) | 13 | 32 |
| Example 1 | Dipropylene glycol n-propyl ether (DOWANOL DPnP) | 20 | 35 |
| Example 2 | Dipropylene glycol n-butyl ether (DOWANOL DPnB) | 18 | 34 |

The data in Table 1 reveals that even at a concentration of 0.1 wt % in steam the yield of bitumen from a steam extraction of oil sand is noticeably increased by the presence of the alkylene glycol ether. The improvement evident from Table 1 data is expected to correlate to actual in situ steam extraction performance from subterranean oil sands.

Examples 3-7

Carry out the process for another reference sample and Examples 3-7 using the same procedure as for Examples 1 and 2 (and the associated reference) except prepare the steam, or steam composition, in the following manner. Instead of injecting a steam stream and a liquid stream into container 10 to form the steam or steam composition, inject only a single stream of steam that already contains any alkylene glycol ether additives specified. Prepare the single stream of steam by generating steam from water (for the reference) or from an aqueous solution containing either 0.1 wt % or 0.4 wt % of the designated alkylene glycol ether (see Table 2) and injecting that generated steam into container 10. The identity of the alkylene glycol ethers for Examples 3-7 and the extraction results are provided in Table 2.

The data in Table 2 reveals that at a concentration of 0.1 wt % or 0.4 wt % in steam the yield of bitumen from a steam extraction of oil sand is noticeably increased by the presence of the alkylene glycol ether. The improvement trends evident from Table 2 data is expected to correlate to actual in situ steam extraction performance from subterranean oil sands. That is, additives showing higher recovery percentages in this experiment than the reference are expected to show higher recovery percentages in an in situ subterranean steam extraction relative to a recovery process without the additive.

TABLE 2

| Sample | Alkylene Glycol Ether | 0.1 wt % Alkylene Glycol Ether | | 0.4 wt % Alkylene Glycol Ether | |
|---|---|---|---|---|---|
| | | Initial Wt % Recovery | Final Wt % Recovery | Initial Wt % Recovery | Final Wt % Recovery |
| Reference | (none) | 13 | 36* | 13 | 36 |
| Example 3 | dipropylene glycol n-propyl ether (DOWANOL DPnP) | 17 | 38 | 20 | 41 |
| Example 4 | dipropylene glycol n-butyl ether (DOWANOL DPnB) | 14 | 33 | 15 | 37 |
| Example 5 | Dipropylene glycol methyl ether (DOWANOL DPM) | 12 | 38 | 16 | 44 |
| Example 6 | propylene glycol n-butyl ether (DOWANOL PnB) | 15 | 37 | 18 | 41 |
| Example 7 | propylene glycol n-propyl ether (DOWANOL PnP) | 12 | 36 | 11 | 37 |

*The Reference Final Wt % Recovery was slightly higher in this set of experiments presumably because the temperature of the steam injected into the oil sand was higher as a result of injecting only steam without a stream of liquid water.
** NM means not measured.

Examples 8-21

For the Reference, pack 50 grams of oil sand (as described in previous examples) into a metal mesh basket and suspend the basket within a Parr reactor containing 150 milliliters of water so that the basket is above and does not contact the water. Heat the Parr reactor using a heating mantel regulated with a temperature controller. Using the temperature controller heat the contents of the Parr reactor to 188° C. over a period of half of an hour and maintain at that temperature for an additional four hours. Turn the power to the heating mantel off and let the Parr reactor and contents cool overnight (approximately 7 hours) to room temperature (approximately 22° C.). Measure the amount of bitumen extracted from the oil sand by toluene extraction of the liquid within the Parr reactor. Approximately 15 wt % of the bitumen in the oil sands is extracted.

For Examples 8-21, repeat the procedure for the Reference except include either 3.75 grams or 15 grams of alkylene glycol ether additive (see Table 3) in the water within the Parr reactor to provide a mixture that is approximately 2.5 wt % or 10 wt % alkylene glycol ether, respectively.

The wt % oil recovery from the oil sands sample using this procedure is reported in Table 3. While the absolute recovery percentages may change in actual in situ subterranean steam extraction, the trends represented in Table 3 are expected to be representative of in situ processes. That is, additives showing higher recovery percentages in this experiment than the reference are expected to show higher recovery percentages in an in situ subterranean steam extraction relative to a recovery process without the additive.

TABLE 3

| Sample | Alkylene Glycol Ether Additive | Wt % Recovery for 2.5 wt % alkylene glycol ether | Wt % Recovery for 10 wt % alkylene glycol ether |
|---|---|---|---|
| Reference | (none) | 15 | 15 |
| Example 8 | propylene glycol n-propyl ether (DOWANOL PnP) | 34 | Not Measured (NM) |
| Example 9 | propylene glycol n-butyl ether (DOWANOL PnB) | 30 | NM |
| Example 10 | propylene glycol n-hexyl ether | 44 | 90 |
| Example 11 | propylene glycol phenyl ether (DOWANOL PPh) | 71 | 99 |
| Example 12 | propylene glycol phenyl ether (DOWANOL PPh) | NM | 50 |
| Example 13 | dipropylene glycol n-propyl ether (DOWANOL DPnP) | 25 | NM |
| Example 14 | dipropylene glycol n-butyl ether (DOWANOL DPnB) | 44 | NM |
| Example 15 | dipropylene glycol n-hexyl ether | 52 | 96 |
| Example 16 | dipropylene glycol 2-ethylhexyl ether | 59 | 89 |
| Example 17 | tripropylene glycol n-propyl ether | 30 | NM |
| Example 18 | tripropylene glycol n-butyl ether | 54 | NM |
| Example 19 | Butylene glycol methyl ether | NM | 36 |
| Example 20 | Butylene glycol n-propyl ether | 40 | 98 |
| Example 21 | Butylene glycol n-butyl ether | 28 | 100 |

What is claimed is:
1. A process comprising:
 (a) injecting a steam composition into a subterranean location containing bitumen, the steam composition comprising an alkylene glycol ether and steam; and
 (b) recovering at least a portion of the bitumen from the subterranean location to above ground;
wherein the alkylene glycol ether is other than a glycol ether amine and
wherein the alkylene glycol ether has the following chemical formula:

$$H(OR_1)_n OR_2$$

where $R_1$ is an alkylene unit, $OR_1$ is an alkylene glycol unit, $R_2$ is an alkyl or aryl, $OR_2$ is an alkyl ether component or aryl ether component and n is an integer that has a value in a range of one or more to ten or less, each alkylene unit has more than two and eight or fewer carbons and when the value of n is more than one, the $R_1$ in each of the alkylene glycol units is the same or different.

2. The process of claim 1, further characterized by the alkylene glycol ether being present in the steam composition at a concentration of 0.01 weight percent or more and 10 weight percent or less based on combined alkylene glycol ether and steam weight.

3. The process of claim 2, further characterized by the alkylene glycol ether being present in the steam composition at a concentration of 0.1 weight percent or more and five weight percent or less based on combined alkylene glycol ether and steam weight.

4. The process of claim 1, further characterized by the alkylene glycol ether being selected from monoalkylene glycol ethers and dialkylene glycol ethers.

5. The process of claim 1, further characterized by the alkylene glycol ether being monoalkylene glycol ether.

6. The process of claim 1, further characterized by the steam composition being free from hydrocarbons when injecting the steam composition into the subterranean location during step (a).

7. The process of claim 1, where the process is a steam assisted gravity drainage process and the steam composition is injected into the ground through a first well and bitumen that is displaced from the ground is recovered to above ground through a second well.

8. The process of claim 1, the process further characterized by being free of disposing a liquid-phase solvent or alkaline water-based extraction liquid into a well.

9. The process of claim 1, wherein the process is free of glycol ether amine as an extraction aid.

10. The process of claim 1, wherein the steam composition comprises a blend of two or more different alkylene glycol ethers.

11. The process of claim 1, wherein the alkylene glycol ether forms an azeotrope with water.

* * * * *